Figure 3:
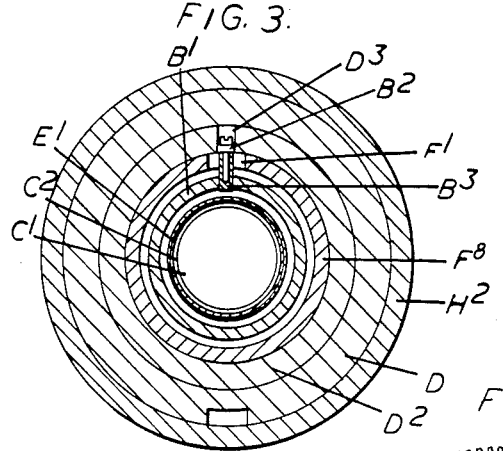

Oct. 17, 1961 G. H. COOK 3,004,471
CONTROL DEVICES FOR OPTICAL OBJECTIVES OF VARIABLE FOCAL LENGTH
Filed Oct. 20, 1958 4 Sheets-Sheet 1
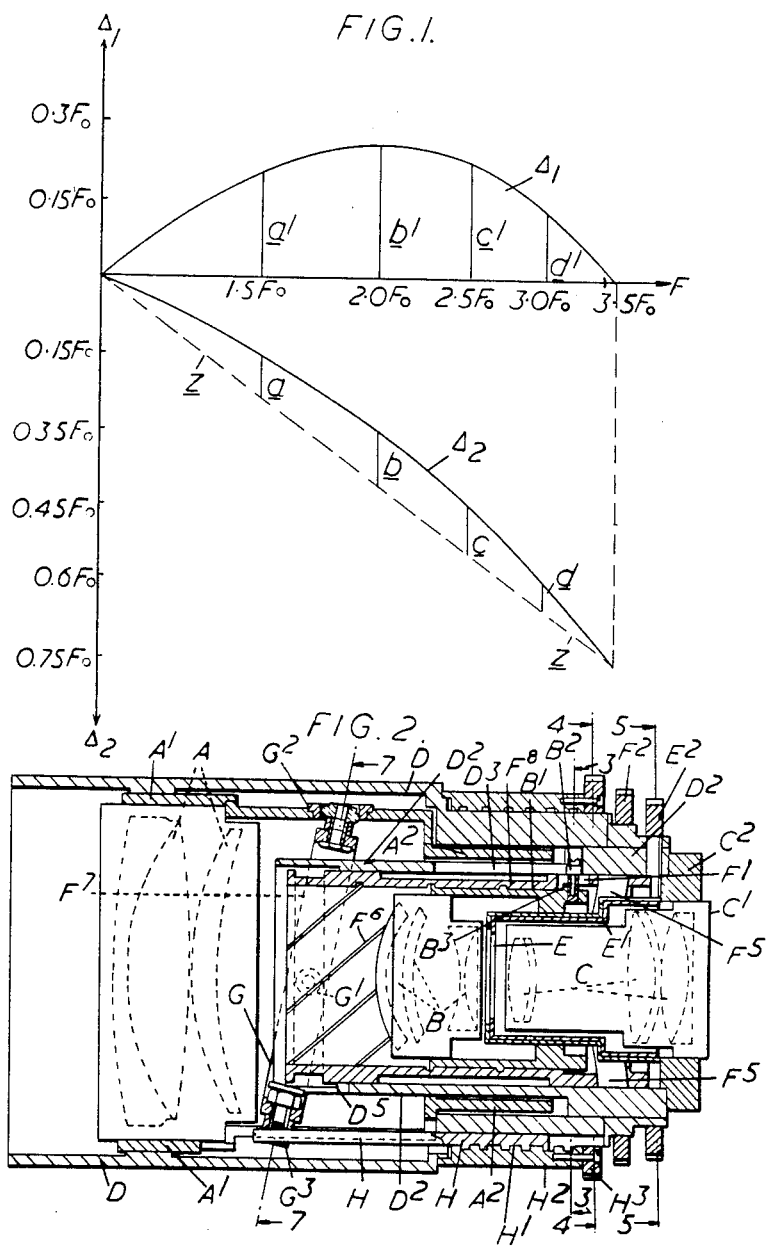
Inventor
G. H. Cook Oct. 17, 1961 G. H. COOK 3,004,471
CONTROL DEVICES FOR OPTICAL OBJECTIVES OF VARIABLE FOCAL LENGTH
Filed Oct. 20, 1958 4 Sheets-Sheet 2

Inventor
G. H. Cook

By Holcomb, Wittaus & Mastro
Attorneys

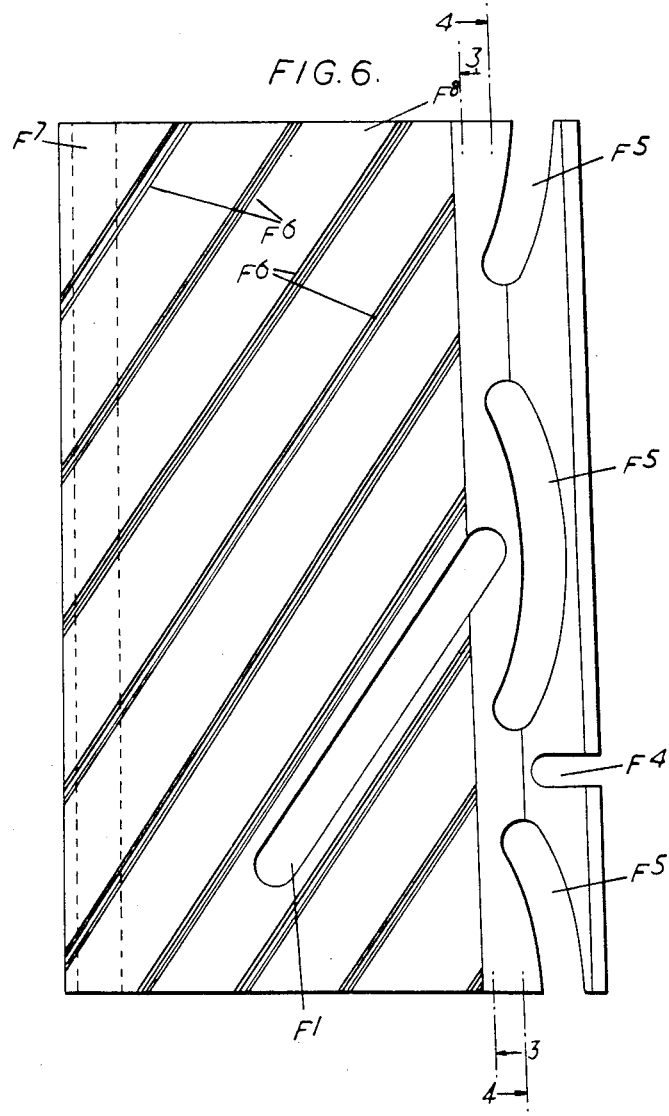

Oct. 17, 1961  G. H. COOK  3,004,471
CONTROL DEVICES FOR OPTICAL OBJECTIVES OF VARIABLE FOCAL LENGTH
Filed Oct. 20, 1958  4 Sheets-Sheet 4
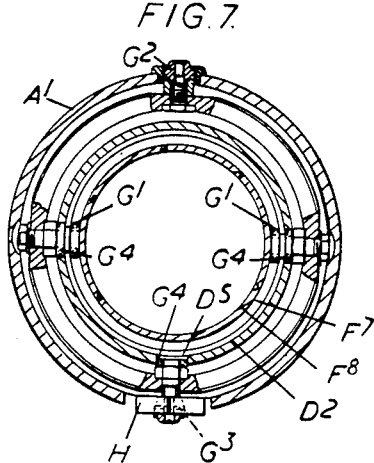
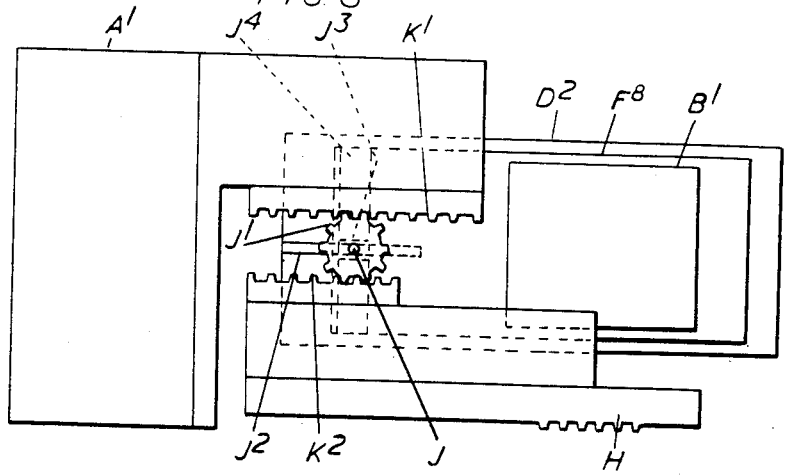
Inventor
G. H. Cook
By
Holcombe, Wetherill & Brisbin
Attorney United States Patent Office 3,004,471
Patented Oct. 17, 1961

3,004,471
CONTROL DEVICES FOR OPTICAL OBJECTIVES OF VARIABLE FOCAL LENGTH
Gordon Henry Cook, Leicester, England, assignor to Taylor, Taylor & Hobson Limited, Leicester, England, a British company
Filed Oct. 20, 1958, Ser. No. 768,286
Claims priority, application Great Britain June 6, 1958
12 Claims. (Cl. 88—57)

This invention relates to a control device for controlling the movements of the relatively movable members of an optical objective of variable equivalent focal length, of the kind in which "zoom" controls (for varying the equivalent focal length of the objective without altering the position of the image plane, and thereby varying the size of the image) can be effected by imparting inter-related movements to two members of the objective having opposite powers, the objective having a third member which is stationary and disposed behind the two movable members.

The invention is for example especially useful for controlling the variable focus objective forming the subject of the copending United States of America patent application Serial No. 764,006, filed September 29, 1958, wherein the objective has a stationary convergent rear member, an axially movable divergent middle member and an axially movable convergent front member, the movements of the front two members being so inter-related that the virtual image of a distant object formed by the divergent combination of such two members has a constant axial position relatively to the stationary rear member throughout the range of variation of the equivalent focal length of the objective.

For controlling the movements of such an objective, it would be possible to drive the middle member at a rate following a linear law with respect to the controlling element, and to drive the front member by means of a cam shaped to maintain a constant position for the final image plane. Such cam, however, would have to be very steep at one end demanding excessive torque for the drive and in addition such an arrangement would have a severe functional disadvantage owing to the fact that the rate of change of focal length is then linear with respect to the movement of the control element. The change in image size due to a small change in focal length at one end of the range is, however, very different from that due to a similar small change of focal length at the other end of the range, so that a steady movement of the control element would produce a slow rate of change of image size at one end of the range varying to a very rapid change of image size at the other end of the range. This would produce a very disturbing visual effect and it is preferable to arrange for the focal length to vary in accordance approximately with a logarithmic law with respect to the movement of the control element.

This disadvantage can be obviated by using two separate cams, one for each of the two members, the cam controlling the middle member imparting a logarithmic rate of change to the focal length with steady movement of the control element, whilst the cam for the front member is appropriately shaped to cooperate with the first cam to maintain constant image position. The use of two cams in this way has, however, severe mechanical disadvantages and makes the device bulky and expensive to manufacture.

The present invention has for its object to provide an improved control device for a variable focus objective of the kind above mentioned, whereby the desired approximately logarithmic rate of change of equivalent focal length of the objective with steady movement of the control element can be satisfactorily obtained with a simple control device occupying relatively little space and easy to manufacture and to operate.

The control device according to the present invention comprises a control element, a cam cooperating with such control element, means for imparting to one of the two relatively movable members of the objective two superimposed axial movements, one of which varies linearly in accordance with the movement of the control element while the other is derived from the control element through the cam, means for imparting to the other movable member of the objective an axial movement derived from the control element through the cam, and a transmission mechanism having an approximately 2:1 ratio interposed in the drive from the cam to one of the two movable members, the movements of such two members being so inter-related as to cause the equivalent focal length of the objective to vary in accordance with an approximately logarithmic law relatively to the movement of the control element, while maintaining the image plane stationary throughout the range of variation.

It will usually be convenient for the movable middle member of the objective to be driven in accordance with the resultant of the two superimposed drives, and for the transmission mechanism to be interposed in the drive from the cam to the movable front member of the objective, whereby the movement of the front member corresponds approximately to twice the component of the movement of the middle member derived through the cam. Various inversions of such arrangement are, however, possible. Thus, for example, the transmission mechanism could be incorporated in the drive from the cam to the middle member, instead of to the front member, in which case it would be operative in the reverse sense as a reducing mechanism, the cam of course then being shaped to suit the desired movement of the front member. Again, it would be possible for the superimposed drives to be applied to the front member, but will usually be preferable to impart such superimposed drives to the middle member as above described.

For superimposing the two axial movements, it may be convenient to employ a driving element which on actuation of the control element is caused both to rotate and also to move axially under the control of the cam, the movable member of the objective to which such superimposed movements are to be imparted being in screw-threaded engagement with the driving element and also being held against rotation. In such case, the axial component of the movement of the driving element may be transmitted through the transmission mechanism to the other movable member of the objective.

In order to enable the objective to be focussed, as may be required, on different axial positions of the object, without alteration of the position of the final image plane, a focussing control element is preferably provided for independently imparting a further axial movement to the movable front member of the objective. When the transmission mechanism is interposed in the drive from the cam to the movable front member of the objective, such mechanism may itself conveniently be utilised for superimposing on such drive the further independent drive from the focussing control element to the front member. Thus, when the superimposed drives are imparted to the middle member of the objective by means of a driving element arranged in the manner above described, the transmission mechanism may conveniently be arranged to act after the manner of a floating lever having three pivots approximately equally spaced, of which one end pivot causes axial movement of the front member of the objective, while the intermediate pivot is moved axially in accordance with the axial component of the movement of the driving element and the other end pivot is moved axially in accordance with the movement of the focussing control element.

Figure 4:
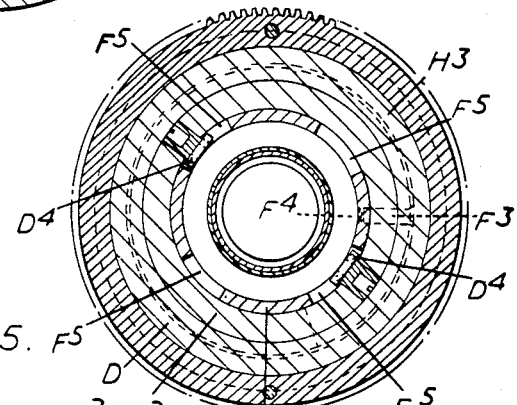
Figure 5:
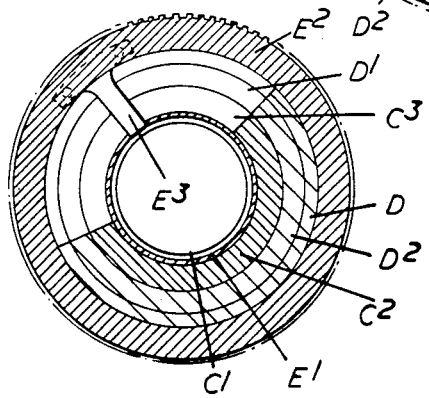

The invention may be carried into practice in various ways but a preferred practical arrangement of control device according thereto will now be described with reference to the accompanying drawings, in which:

FIGURE 1 is a graph illustrating the movements of the front two members of the objective in the preferred arrangement, FIGURE 2 is a diagrammatic view of the preferred arrangement in axial section, FIGURE 3 is a transverse section on the line 3—3 of FIGURE 2, FIGURE 4 is a transverse section on the line 4—4 of FIGURE 2, FIGURE 5 is a transverse section on the line 5—5 of FIGURE 2, FIGURE 6 shows in enlarged development the driving element in the preferred arrangement and also indicates the positions of the transverse sections of FIGURES 3 and 4 in relation to such driving element, FIGURE 7 is a transverse section through the transmission mechanism of the preferred arrangement, such section containing the oblique line 7—7 of FIGURE 2, and FIGURE 8 shows very diagrammatically an alternative transmission mechanism for the arrangement.

For convenience, such arrangement will be described as applied to the variable focus objective described in the specification of the copending U.S. patent application above mentioned.

Such variable focus objective, one example of which is shown in FIGURE 2, is corrected for spherical and chromatic aberrations, coma, astigmatism, field curvature and distortion throughout the range of variation, and comprises an axially movable divergent member B located in front of a stationary convergent rear member C and behind an axially movable convergent front member A, wherein throughout the range of variation the ratio of the equivalent focal length of the divergent combination of the front two members to the equivalent focal length of the complete objective remains constant and the virtual image of a distant object formed by such divergent combination has a constant axial position relatively to the stationary rear member. In the example of such objective shown, the front member A consists of two components, the second member B consists of three components and the third member C also consists of three components. Focussing for near objects is preferably effected by axial movement of the convergent front member A independently of the second and third members B and C.

As is described in the specification of the copending application, the movements of the two front members A and B are such that during the variation of the equivalent focal length F of the complete objective from its minimum value $F_0$ to its maximum value $F_m$, the divergent middle member B moves backwards towards the stationary rear member C, while the convergent front member A at first moves forwards and then moves back again to its initial position. If $\Delta_1$ represents the forward movement of the front member from its initial position, and $\Delta_2$ the backward movement of the middle member from its initial position, $f_2$ being the numerical value of the equivalent focal length of the divergent middle member, then the movements can be defined mathematically by the equations $$\Delta_1 = \frac{f_2[F(F_m + F_0 - F) - F_0 F_m]}{F\sqrt{F_m F_0}}$$

$$\Delta_2 = \frac{f_2(F - F_0)}{\sqrt{F_m F_0}}$$

If these two movements represented by $\Delta_1$ and $\Delta_2$ are plotted graphically with respect to a logarithmic scale of F from one end of the range to the other, for example from $F = F_0$ to $F = 3.555F_0$ as shown in FIGURE 1, it will be seen that the vertical distance between a point on the curve $\Delta_2$ and a straight line z—z joining the extremities of such curve is approximately equal to half the value of $\Delta_1$ at the same value of F. For example, at $F = 1.5F_0$, the vertical distance $a$ between the curve $\Delta_2$ and the line z—z is $0.094F_0$ while the value of $\Delta_1$ is $a^1$ which equals $0.205F_0$. Further, at $F = 2.0F_0$, $F = 2.5F_0$ and $F = 3.0F_0$ respectively, if $b$, $c$ and $d$ are the vertical distances between $\Delta_2$ and the line z—z and $b^1$, $c^1$ and $d^1$ are the values of $\Delta_1$, then $b = 0.119F_0$ while $b^1 = 0.233F_0$, $c = 0.103F_0$ while $c^1 = 0.195F_0$ and $d = 0.062F_0$ while $d^1 = 0.110F_0$. In other words, the movement of the front member A is approximately twice the difference between the desired movement of the middle member B and a linear movement. This makes it possible to drive the middle member from a control element in accordance with a linear law and to superimpose on such drive a second drive from the control element through an appropriately shaped cam, and to use the same cam for the drive for the front member with the interposition of a transmission mechanism having a 2:1 ratio. With such a control device, a steady movement of the control element will cause the equivalent focal length of the objective to change in accordance with a close approximation to a logarithmic law, which will in turn produce an approximately constant rate of change of image size throughout the range of variation. The preferred construction of control device now to be described is based on this principle and incorporates also a focussing control element which acts to cause independent movement of the front member A alone to enable the objective to be focussed on near objects.

In this construction, shown diagrammatically in FIGURE 2, the stationary rear member C of the objective is carried in a mount $C^1$ itself detachably mounted in a member $C^2$ fixed to the main fixed casing D of the variable focus objective at the rear end thereof. The purpose of the detachable mounting of the rear member C of the objective is to enable such member to be replaced, when desired, by an alternative rear member, in the manner described in the specification of the copending application. The iris diaphragm is indicated at E in front of the stationary rear member C and is carried by a member $E^1$ within the fixed member $C^2$ and rotatable relatively thereto. The iris diaphragm is not removable with the rear member C of the objective. An iris control ring $E^2$, which may be operated by hand or by power (for example by remote control) is provided on the fixed casing D. Such iris control ring $E^2$ is conveniently shown provided with peripheral teeth for power operation. The sectional view of FIGURE 5 shows a key $E^3$ carried by such control ring $E^2$ for engagement in a slot in the rotatable diaphragm member $E^1$, the fixed casing D and the fixed element $C^2$ for carrying the rear member C being provided with aligned arcuate slots $D^1$ and $C^3$ for accommodating the key $E^3$ and for permitting rotation thereof with the control ring $E^2$ to open or to close the iris diaphragm at E (FIGURE 2) as the member $E^1$ rotates.

The middle member B of the objective is housed in a mount $B^1$ bearing an external screwthread of quick pitch, which engages with an internal screwthread $F^6$ in a driving elements $F^8$, the middle member B being keyed against rotation by means of a roller $B^2$ on its mount $B^1$ engaging in a longitudinal slot $D^3$ in a fixed part $D^2$ carried by the main casing D. For convenience, in FIGURES 2 to 6, the fixed part $D^2$ is sectioned in the same manner as the fixed casing D to indicate that such fixed part and such casing are effectively integral with one another, although such figures also indicate that such fixed part and such casing are actually formed separately. The connection $B^3$ from the mount $B^1$ of the middle member B to such roller $B^2$ conveniently passes through the driving element $F^8$, such element $F^8$ being provided with a helical slot $F^1$ to prevent fouling during the movements, as shown in FIGURE 3.

The "zooming" control element consists of a ring $F^2$, knurled for operation by hand or toothed (as shown) for operation by power, as may be required, and rotatably mounted on the main casing D coaxially with the optical axis of the objective, this ring $F^2$ carrying an internally projecting key $F^3$ (see FIGURE 4) which engages in a longitudinal slot $F^4$ in the driving element $F^8$, so that rotation of the control ring $F^2$ also causes the driving element $F^8$ to rotate. The fixed casing D is provided with an arcuate slot (not shown) for accommodating the key $F^3$ and for permitting rotation thereof with the control ring $F^2$.

The driving element $F^8$ is also mounted to slide axially in the fixed part $D^2$ carried by the casing, and for this purpose the driving element $F^8$ is provided near its rear end (in a position which will not interfere with the longitudinal slot $F^4$ in which the key $F^3$ carried by the control element $F^2$ engages) with two similar cam grooves $F^5$ in diametrically opposite positions, each engaged by a roller $D^4$ on the fixed part $D^2$ carried by the fixed casing D, in order to impart a balanced drive. Such rollers $D^4$ are shown in FIGURE 4, one at each end of one of the cam grooves $F^5$. The other end of each cam groove $F^5$ is also shown in FIGURE 4, but the central portion of each cam groove is out of the plane of the section. It will be clear that with this arrangement, when the zooming control ring $F^2$ is rotated, the driving element $F^8$ rotates in synchronism therewith and at the same time moves axially in the manner determined by the shape of the cam grooves $F^5$. The shape of the cam grooves $F^5$ is in fact such that, during operation of the zooming control ring $F^2$ through an angle, which in one practical arrangement amounts to 124 degrees, from the position of minimum focal length to the position of maximum focal length, the driving element $F^8$ moves at the appropriate rate first forward and then back again to its initial axial position. At the same time, owing to the fact that the middle member mount $B^1$ is held against rotation by the roller $B^2$ and is screwthreaded to the driving element $F^8$, the middle member B moves at constant rate from the front end of the driving element $F^8$ to its rear end. Since, however, the middle member B is carried by the driving element $F^8$ it will also participate in the forward and backward axial movement of the driving element, so that the resultant movement of the middle member B of the objective relatively to the stationary rear member C of the objective consists of a backward movement at first at a slow rate and afterwards at a relatively rapid rate. It is to be appreciated that FIGURE 2 shows the middle member B at the rear end of the driving element $F^8$, i.e. the position for maximum focal length, and in this figure and also FIGURES 3 and 4 the various other parts of the arrangement are shown in positions corresponding to this condition.

For convenience, in order to show the shapes of the cam grooves $F^5$ and the relative positions of such grooves and the slots $F^1$ and $F^4$ in the driving element $F^8$ more clearly, a development of such element $F^8$ is shown in FIGURE 6. It should be mentioned that the axial section of FIGURE 2 passes through the centre of the driving element $F^8$ in the development, whilst the positions of the transverse sections of FIGURES 3 and 4 relative to the driving element are for clarity also indicated in FIGURE 6.

At its front end, the driving element $F^8$ is provided with a circumferential groove $F^7$ (also shown in FIGURE 6), lying in a plane transverse to the optical axis of the objective. In this groove $F^7$ at opposite ends of a diameter, two rollers $G^1$ engage which are carried internally by a gimbal ring G (see FIGURE 7). This gimbal ring also carries externally two further rollers $G^2$, $G^3$ at opposite ends of a diameter which lies at right angles to the diameter of the gimbal ring G determined by the two internal rollers $G^1$. The first of such external rollers $G^2$ fits within a recess in the mount $A^1$ of the front member of the objective, such mount having a rearward projection $A^2$ guided in the fixed casing D to permit axial sliding of the mount without rotation. The second external roller $G^3$ similarly fits within a recess in a normally stationary bar H which projects forwardly through and slides in a slot cut in the rearward projection $A^2$ of the mount $A^1$ of the front member A. This bar H is cut on its outer surface at its rear end with the appropriate portions of a screwthread $H^1$ engaging with an internally threaded sleeve $H^2$ carrying a ring $H^3$ held against axial movement in the fixed casing D. This ring $H^3$ constitutes a focusing control element, and can be rotationally adjusted by hand or by power, as may be required, to enable the objective to be focused on a desired object position, in the manner described below.

It will be clear that with the above arrangement the gimbal ring G acts after the manner of a floating lever having three pivots, of which the two end pivots are constituted respectively by the two external rollers $G^2$ and $G^3$ engaging in their respective recesses, while the intermediate pivot is constituted by the pair of internal rollers $G^1$ and thus has a pivot axis midway between the two end pivots. For any one given position of adjustment of the focussing control ring $H^3$, the second external roller $G^3$ on the gimbal ring G is held stationary and acts as the fulcrum of the floating lever. It will be clear that in such conditions the floating lever will act as a 2:1 transmission mechanism during zooming control movements to cause the front member A of the objective to move in the same direction as and twice as fast as the axial sliding movement of the driving element $F^8$, so that during the range of variation the front member A first moves forward (through twice the distance of the forward movement of the driving element $F^8$) and then back again to its initial position. If now it is desired to make a focussing adjustment by moving the focussing control ring $H^3$, the intermediate pivot (determined by the internal rollers $G^1$) of the floating lever will act as fulcrum and the first external roller $G^2$ on the gimbal ring will move forward (or backward) through the same distance that the second external roller $G^3$ moves backward (or forward), thus causing movement of the front member A to the desired extent independently of movement of the middle member B. There is nothing to prevent a focussing adjustment from being made during the course of a zooming control movement, if for any reason such adjustment is called for. Conveniently, in order to provide a guide for the movements of the gimbal ring G and to ensure that the centre of such ring remains substantially on the axis of the driving element $F^8$ during such movements, the gimbal ring G also carries three further internal rollers $G^4$, two carried on the diameter determined by the internal rollers $G^1$ and one on the diameter transverse thereto. Each of these rollers $G^4$ loosely engages in a longitudinal slot $D^5$ in the front end of the fixed part $D^2$ carried by the casing D in such a manner that the necessary pivotal movements of the gimbal ring are not restricted.

This floating lever mechanism gives an exact 2:1 transmission ratio. In actual fact, however, the ratio calculated theoretically from the graphs is only approximately 2:1, so that with the above described mechanism, assuming that the cam shape is chosen to give the ideal logarithmic rate of zooming, the focussing on to the fixed final image plane will be accurate at the two ends of the range and also in the middle of the range, but there will be slight focussing errors in intermediate positions in both halves of the range. These errors are slight and may be acceptable when the total range of variation is relatively small and when using a small relative aperture. In practice, however, in most cases such errors will not be acceptable, but it can be shown that these errors can be avoided by a slight modification in the shape of the cam, constituted by the cam grooves $F^5$, which involves only a slight departure from the ideal logarithmic rate of zooming not noticeable in use.

Thus, referring back to the equations set out above defining the movements $\Delta_1$ and $\Delta_2$ of the front and middle members A and B required to ensure accuracy of focussing on to the final image plane throughout the range, it will be clear that, since the driving element $F^8$ returns to its initial axial position at the end of the range, the linear component of the movement of the middle member B due to its screwthreaded engagement with the driving element $F^8$ can be expressed as $x\Delta_{2(M)}$, where $\Delta_{2(M)}$ is the maximum value of $\Delta_2$ and $x$ is a factor varying from 0 to 1 in accordance with a linear law. The mechanical movements of the two members, owing to the exact 2:1 ratio are given by the equation $$\Delta_1 = 2[x\Delta_{2(M)} - \Delta_2]$$

It will also be clear from the equation above given for $\Delta_2$ that $$\Delta_{2(m)} = \frac{f_2(F_m - F_0)}{\sqrt{F_0 F_m}}$$

Therefore $$\Delta_1 + 2\Delta_2 = \frac{2xf_2(F_m - F_0)}{\sqrt{F_0 F_m}}$$

By substituting in this equation the expressions for $\Delta_1$ and $\Delta_2$ in the equations above given and solving for F, it will be clear that $$2F = (2x-1)(F_m - F_0) + \sqrt{(2x-1)^2(F_m - F_0)^2 + 4F_0 F_m}$$

It can be shown that this expression gives a rate of change of F, relative to a linear variation of $x$, which is so nearly logarithmic that the departure from the ideal logarithmic rate of zooming is not perceptible in practice.

It would also be possible, if desired, to use a transmission ratio differing slightly from the 2:1 ratio described and to provide in the shape of the cam a somewhat different departure from the ideal logarithmic rate of zooming, in order to get accurate focussing throughout on to a fixed final image plane.

It will be appreciated that the foregoing arrangement of control device has been described by way of example only and may be modified in various ways within the scope of the invention. Thus for instance, other forms of transmission mechanism giving an exact or approximate 2:1 ratio, may be employed. For example, a differential gear may be employed, instead of the floating lever arrangement. In this case, for example as indicated in FIGURE 8, the driving element $F^8$ is used to cause axial movement of the shaft J of a pinion $J^1$ engaging between two toothed racks lying parallel to the axis, one such rack $K^1$ being carried by the mount $A^1$ of the front member A whilst the other rack $K^2$ is carried by the toothed longitudinal bar H driven by the focussing control element. The shaft J slides in a longitudinal slot $J^2$ in the fixed part $D^2$ carried by the casing and is driven by the driving element $F^8$, which also drives the mount $B^1$ for the middle member of the objective through a roller $J^3$ carried by such shaft J and engaging a circumferential groove $J^4$ in such driving element $F^8$. For clarity, in the figure the various parts of the arrangement are shown in positions corresponding to a condition in which the objective has a focal length intermediate of the minimum and maximum focal lengths.

Again, as has already been mentioned, various inversions of the drives can be used, such for example as imparting superimposed linear and cam drives to the front member and imparting a cam drive alone through a reducing transmission mechanism to the middle member.

Further, it is not essential to the invention that the front and rear members of the objective should be convergent and the middle member divergent, and the converse arrangement may be employed using a divergent front member and a convergent middle member, the rear member being convergent or divergent, as circumstances may require. In this case, a control device may be used similar to that above described, with the exception that when moving from the minimum focal length position to the maximum focal length position, the middle member will have to move forwards, whilst the front member will first move backwards and then forwards.

What I claim as my invention and desire to secure by Letters Patent is:

1. A control device for an optical objective of variable equivalent focal length having a stationary rear member and two relatively movable members of opposite powers, comprising a control element, a cam cooperating with such control element, means for simultaneously applying two drives to one of the two movable members to impart two superimposed axial movements thereto, such driving means incorporating means whereby one of such two drives is derived from the control element to impart an axial movement varying in linear relationship to the movement of the control element and whereby the other of such two drives is derived from the control element through the cam, means for applying a drive derived from the control element through the cam to the other movable member to impart an axial movement thereto, and means inter-relating the two drives derived through the cam whereby, in accordance with the shape of the cam, the movements of the two movable members cause the equivalent focal length of the objective to vary in accordance with an approximately logarithmic law relatively to the movement of the control element while maintaining the image plane stationary throughout the range of variation, such means incorporating a transmission mechanism having a 2:1 ratio and means interposing such transmission mechanism in the drive from the cam to one of the movable members.

2. A control device as claimed in claim 1 including a focussing control element for independently imparting a further axial movement to the movable front member of the objective to enable the objective to be focussed on different object positions without alteration of the position of the final image plane.

3. A control device as claimed in claim 2, in which the transmission mechanism is interposed in the drive from the cam to the movable front member of the objective and is itself utilised for superimposing on such drive the further independent drive from the focussing control element to the front member.

4. A control device as claimed in claim 3 in which the means for imparting the two superimposed axial movements to one of the members of the objective comprises a driving element and means whereby on actuation of the control element such driving element is caused both to rotate and to move axially under the control of the cam, the movable member to which such superimposed drives are imparted being in screwthreaded engagement with the driving element and cooperating with means for holding such member against rotation relatively to such driving element.

5. A control device as claimed in claim 4 in which the means for imparting axial movement to the other member of the objective comprises means for transmitting the axial component of the movement of the driving element through the transmission mechanism to such other movable member.

6. A control device as claimed in claim 1 in which the means for imparting the two superimposed axial movements to one of the members of the objective comprises a driving element and means whereby on actuation of the control element such driving element is caused both to rotate and to move axially under the control of the cam, the movable member to which such superimposed drives are imparted being in screwthreaded engagement with the driving element and cooperating with means for holding such member against rotation relatively to such driving element.

7. A control device as claimed in claim 6 in which the means for imparting axial movement to the other member of the objective comprises means for transmitting the axial component of the movement of the driving element through the transmission mechanism to such other movable member.

8. A control device for an optical objective of variable equivalent focal length having a stationary rear member and two relatively movable members of opposite powers, comprising a control element, a cam cooperating with such control element, means for simultaneously applying two drives to the movable middle member of the objective to impart two superimposed axial movements thereto, such driving means incorporating means whereby one of such two drives is derived from the control element to impart an axial movement varying in linear relationship to the movement of the control element and whereby the other of such two drives is derived from the control element through the cam, means for applying a drive derived from the control element through the cam to the movable front member of the objective to impart an axial movement thereto, and means inter-relating the two drives derived through the cam whereby, in accordance with the shape of the cam, the movements of the two movable members cause the equivalent focal length of the objective to vary in accordance with an approximately logarithmic law relatively to the movement of the control element while maintaining the image plane stationary throughout the range of variation, such means incorporating a transmission mechanism having a 2:1 ratio and means interposing such transmission mechanism in the drive from the cam to the movable front member of the objective, whereby the movement of the front member corresponds to approximately twice the component of the movement of the middle member derived through the cam.

9. A control device as claimed in claim 8 in which the means for imparting the two superimposed axial movements to the middle member of the objective comprises a driving element and means whereby on actuation of the control element such driving element is caused both to rotate and to move axially under the control of the cam, such middle member being in screwthreaded engagement with the driving element and cooperating with means for holding such member against rotation relatively to such driving element.

10. A control device as claimed in claim 9 in which the means for imparting axial movement to the front member of the objective comprises means for transmitting the axial component of the movement of the driving element through the transmission mechanism to such front member.

11. A control device as claimed in claim 10 in which the transmission mechanism effectively consists of an element having three pivots approximately equally spaced, of which one end pivot causes axial movement of the front member of the objective, while the intermediate pivot is moved axially in accordance with the axial component of the movement of the driving element and the other end pivot is moved axially in accordance with the movement of the focussing control element.

12. A control device as claimed in claim 8 including a focussing control element for independently imparting a further axial movement to the movable front member of the objective to enable the objective to be focussed on different object positions without alteration of the position of the final image plane, the transmission mechanism being itself utilised for superimposing such independent drive on the drive from the cam to the front member of the objective.

References Cited in the file of this patent

UNITED STATES PATENTS

| | | |
|---|---|---|
| 1,138,217 | Holst | May 4, 1915 |
| 2,165,341 | Capstaff et al. | July 11, 1939 |
| 2,566,485 | Cuvillier | Sept. 4, 1951 |
| 2,649,025 | Cook | Aug. 18, 1953 |
| 2,663,223 | Hopkins | Dec. 22, 1953 |
| 2,720,817 | Mills | Oct. 18, 1955 |
| 2,741,155 | Hopkins | Apr. 10, 1956 |
| 2,778,272 | Reymond | Jan. 22, 1957 |
| 2,843,016 | Reiss | July 15, 1958 |
| 2,844,996 | Klemt | July 29, 1958 |
| 2,847,907 | Angenieux | Aug. 19, 1958 |
| 2,859,654 | Back | Nov. 11, 1958 |